(No Model.)
J. R. DENISON.
QUICK ACTION VISE.
No. 503,075. Patented Aug. 8, 1893.
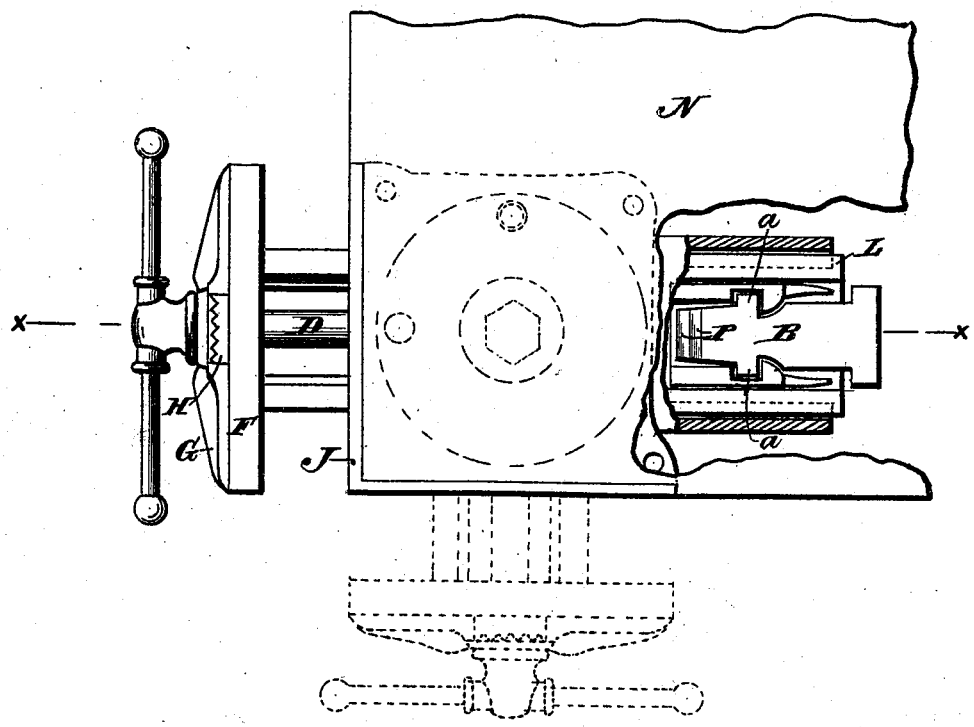
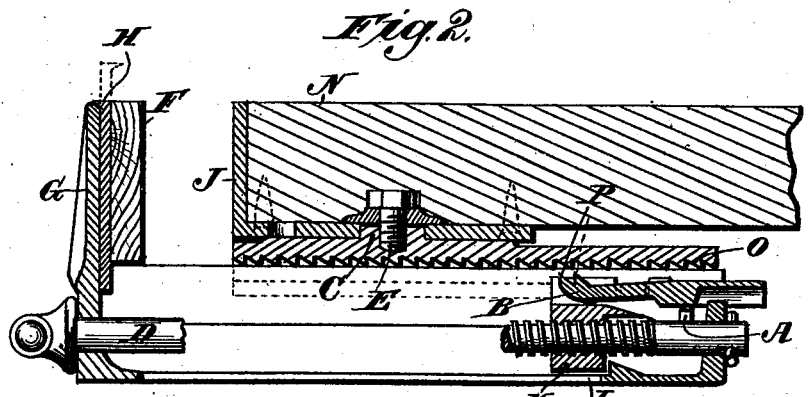
Witnesses:
Robert Pratt
J. A. Rutherford
Inventor:
James R. Denison.
By Edward Taggart,
Atty.

UNITED STATES PATENT OFFICE.

JAMES R. DENISON, OF GRAND RAPIDS, MICHIGAN.

QUICK-ACTION VISE.

SPECIFICATION forming part of Letters Patent No. 503,075, dated August 8, 1893.

Application filed June 16, 1892. Serial No. 436,933. (No model.)

*To all whom it may concern:*

Be it known that I, JAMES R. DENISON, a citizen of the United States, residing at the city of Grand Rapids, in the county of Kent and State of Michigan, have invented certain new and useful Improvements in Quick-Action Vises, of which the following is a specification.

This invention has for its object to provide a new and improved quick action vise, of such construction that the movable jaws may be readily placed at the desired position and then tightened to hold or retain any object to be operated upon. To accomplish this object my invention involves the features of construction and the combination or arrangement of devices hereinafter described and claimed, reference being made to the accompanying drawings, in which—

Figure 1 shows a plan view of my invention attached to a bench, with portions of the bench cut away in order to show more fully the construction of the quick action vise. The dotted lines show the position of movable jaws and screw. The same has been turned one quarter way round, or through ninety degrees of space. Fig. 2 shows a sectional view through line $x$—$x$ of Fig. 1.

Similar letters refer to similar parts throughout the several views.

N represents a portion of the bench to which my invention is applied.

J represents a metallic framework having two parts at right angles, the whole connected to a bed; the angular parts form the jaws, one at the end and one at the side of the table, and the center of the bed part adapted to support the screw, movable jaw, &c.

D is a screw extending from the outer jaw inward a suitable distance, and provided with a thread of an ordinary bench screw.

The metallic frame work J has a bottom or plate to which is attached and which supports the oscillating parts of the vise, allowing the same to be adjusted so as to bring the movable jaw in operative position with either of the sides of the angular frame J, as hereinafter more fully described.

A is a projection near the inner end of the screw rod, and movable therewith which is adapted to raise one end of the dog B, in order to release the dog from the teeth O. The dog is provided with lugs $a\ a$, which lugs are supported in the nut or block K, as shown in Fig. 1, forming a fulcrum or pivoted connection for the dog. The nut K, has a thread engaging with the screw thread of the bench screw D. The dog is also provided with projections P, which engage the teeth O of a ratchet bar, which bar is preferably a part of or located on the supporting way which supports the movable jaw and bench-screw. The dog B rests in and moves with the block K. The block K is supported upon the way or guide L. When the bench screw is turned so as to remove the projection A, from its operative position with the dog B, the screw acts as an ordinary bench screw and the stock may be clamped and unclamped in the ordinary manner.

C is a swivel attachment whereby the screw and movable parts are attached to the bed of the frame J—J, and screw E being used for the purpose of making the attachment.

F is a wooden face for the movable jaw G. The object of using the wooden face is to prevent the marring or bruising the wood when the same is held between the movable and stationary jaws.

G is the movable jaw, and H is an adjustable bench dog which may be used, in case it is desired, in planing or smoothing lumber and other purposes. This dog H is reversible so that the same may be dropped down out of the way.

In operating my invention the screw is turned by means of a handle until the projection A, lifting the rear end of the dog B disconnects the front end from the notches O; a movable jaw G is then placed at about the position it is required to clasp the stock to be operated upon; the stock is placed between the jaws, and the farther movement of the screw in the same direction will remove the projection A from the rear end of the dog B, allowing the front end to engage with the ratchet bar O, when the screw operates upon the block K and thereby upon the jaw G, clasping the stock to be operated upon between the jaw G and the jaw formed by the metallic framework J.

By my construction I enable the user to have a quick action vise, and also, one which has great range of movement. I also retain the advantage of operating the disconnecting device and the clamping device by means of the screw handle.

Having thus described my invention, what I claim is—

1. A bench vise, consisting of a laterally swinging jaw G, a metallic framework J having two right angled perpendicular sides and a bed, a bench screw and swivel supported by the bed of the said framework, said screw moving with the laterally swinging jaw, substantially as described.

2. A bench vise provided with a swinging jaw, a metallic framework having two right angled perpendicular sides and a bed adapted, to support the swinging jaw and its adjunctive mechanism, a bench screw and swivel supported upon the bed of the said framework, and having no projection or bolt connection directly with the bench, said jaw adapted for use at either side or end of the table, substantially as described.

3. The combination of a frame having two perpendicular sides at right angles to each other, a bottom or bed, a frame for supporting the swinging jaw, having an upward projection integral therewith, passing through the bed of the frame, a screw and washer for attaching the same to the bed or frame, and entire swinging mechanism supported from the bed of the metallic frame or stationary jaws, substantially as and for the purpose described.

4. In a quick action vise, the combination of a bench screw, a nut, a swiveled ratchet-bar located above the bench screw, an oscillating dog supported by said nut and having its forward end provided with a toothed part, a projection upon the bench screw adapted to engage with the rear projection of the dog and to disconnect the same from engagement with the ratchet bar when placed in proper position and adapted to move out of place so as to not operate or disconnect said dog, substantially as described.

5. The combination with a metallic framework J adapted to be secured to a bench and provided with a bed, of a ratchet bar O swiveled to the bed, a laterally swinging jaw G provided with a screw D having a projection A, a nut K engaging the screw, and a pivoted dog having a projection P, said ratchet bar, jaw, screw, nut and pawl adapted to swing together for the operation of the jaw at different sides of the metallic framework, substantially as described.

In witness whereof I have hereunto set my hand and seal in the presence of two witnesses.

JAMES R. DENISON. [L. S.]

Witnesses:
 EDWARD TAGGART,
 DENTON O. SPROAT.